United States Patent [19]

Stankewitz et al.

[11] Patent Number: 5,684,625
[45] Date of Patent: Nov. 4, 1997

[54] ILLUMINATION DEVICE FOR MICROSCOPES

[75] Inventors: Hans Werner Stankewitz; Peter Karbe, both of Wetzlar, Germany

[73] Assignee: Leica Mikroskopie und Systeme GmbH, Wetzlar, Germany

[21] Appl. No.: 692,309

[22] Filed: Aug. 5, 1996

Related U.S. Application Data

[63] Continuation of Ser. No. 211,951, filed as PCT/DE93/00696, Aug. 6, 1993, abandoned.

[30] Foreign Application Priority Data

Sep. 19, 1992 [DE] Germany .......................... 42 31 439.9

[51] Int. Cl.$^6$ .......................... G02B 21/06; G02B 21/00
[52] U.S. Cl. .......................... 359/385; 359/368; 359/388; 359/389; 359/387
[58] Field of Search .......................... 359/368, 385, 359/388, 389, 387

[56] References Cited

U.S. PATENT DOCUMENTS

| | | | |
|---|---|---|---|
| 3,679,287 | 7/1972 | Takahashi et al. | 350/87 |
| 3,799,645 | 3/1974 | Stankewitz | 350/87 |
| 3,933,408 | 1/1976 | Reinert | 359/385 |
| 4,063,797 | 12/1977 | Taira | 350/87 |
| 4,163,150 | 7/1979 | Stankewitz | 250/205 |
| 4,253,726 | 3/1981 | Taira | 350/87 |
| 4,384,200 | 5/1983 | Taira | 250/205 |
| 4,852,985 | 8/1989 | Fujihara et al. | 359/387 |
| 5,136,429 | 8/1992 | Bergner et al. | 359/663 |

*Primary Examiner*—Paul M. Dzierzynski
*Assistant Examiner*—Mohammad Y. Sikder
*Attorney, Agent, or Firm*—Foley & Lardner

[57] ABSTRACT

The invention provides a switchable bright-field transmitted-light illumination device for microscopes which provides for in each case two objectives of different apertures in both switch positions a simple automatic illumination arrangement without adjustment of the position and of the opening of the diaphragms. For this purpose, in an illumination device, comprising light source 1, collector 2, field diaphragm 3, aperture diaphragm 4 and basic condenser 7 with removable condenser head 8 or condenser lens element 11, which can be switched in alternatively to the condenser head 8 between the aperture diaphragm 4 and the basic condenser 7, the aperture diaphragm 4 is arranged between the collector 2 and the field diaphragm 3 and is imaged by an intermediate imaging by at least two auxiliary lenses 5 and 6 into a plane 12 conjugate with the aperture diaphragm 4. The basic condenser 7 is thus suitably supplemented in the one switch position by the condenser head 8, in the other switch position by a condenser head 10 and the condenser lens element 11 such that two switchable condenser magnifications are in the ratio of the switchable objective magnifications.

8 Claims, 1 Drawing Sheet

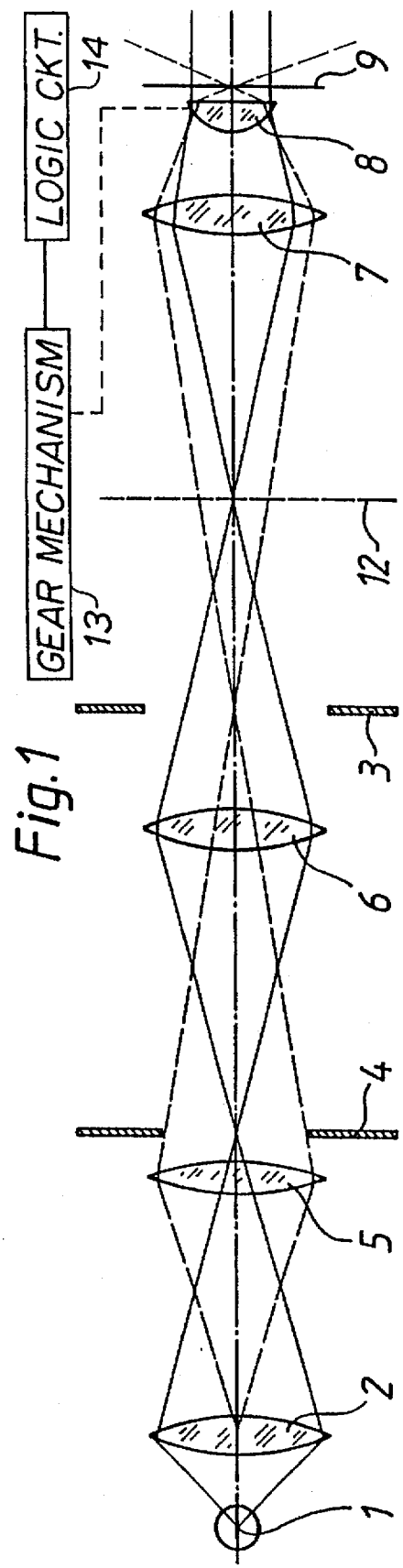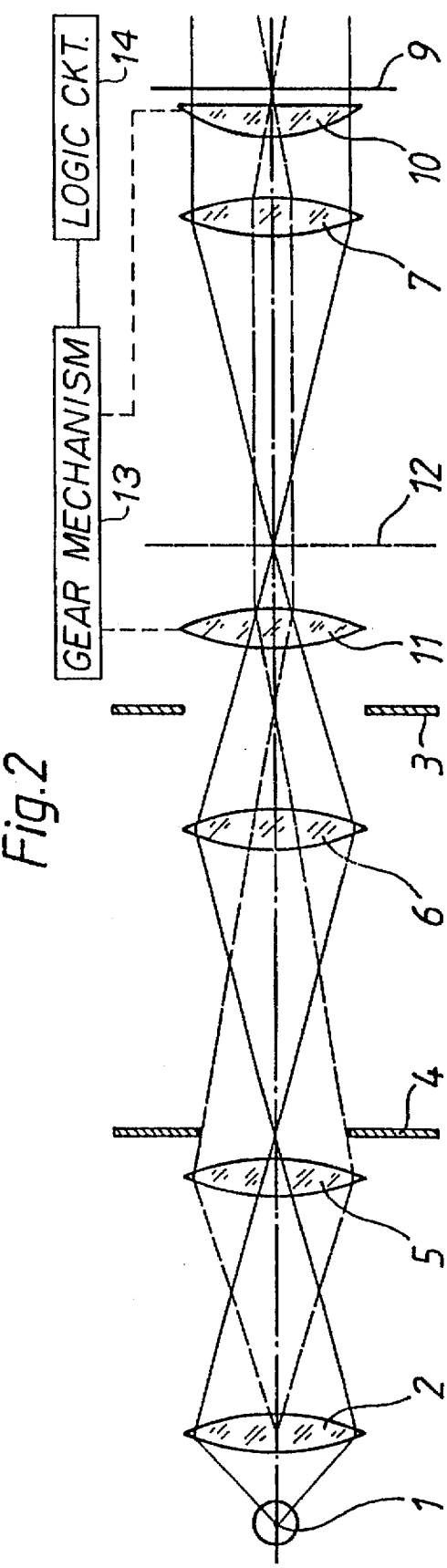

100 1
ILLUMINATION DEVICE FOR MICROSCOPES

This application is a continuation of application Ser. No. 08/211,951, filed May 4, 1994, now abandoned, which is the National Stage application of PCT/DE93/00696, filed Aug. 6, 1993.

The invention relates to an illumination device for microscopes.

Illumination devices with condenser turrets are known, which image a field diaphragm in the desired magnification adjustment into the object plane in order to always achieve the same optimum adaptation to the illumination by the objective magnifications assigned to the various condensers. Only the condensers assigned to highly magnifying objectives have an aperture diaphragm. A disadvantage of such a device is that, after every condenser turret switch-over, to achieve a Köhler illumination it is necessary to reset the imaging of the lamp filament into the plane of the aperture diaphragm individually by adjusting the collector with respect to each condenser.

Other illumination devices use condensers which are composed of a basic condenser with various, interchangeably arranged condenser lenses. These interchangeable condenser lenses bring about the respective adaptation to the objectives. They bring this about by an alteration of the focal length of the condenser. This has the consequence that the imaging of the field diaphragm into the object plane has to be reset after every switching-over of condensers.

For this purpose, either the basic condenser and the collector have to be displaceably arranged or only the collector is displaceable, and the displacement of the basic condenser necessary for the imaging of the field diaphragm is compensated by an additional lens element. The displacements required in the case of switching over condensers are complex and hinder the smooth progress of work with frequent objective changing.

German Patent Publication DE 21 16 625 discloses an illumination device with additionally switchable condenser lenses, in which after switching over condensers, the sharp definition of the field diaphragm and the position of the light source image, that is to say Köhler illumination, are retained for each additionally switched-in condenser lens without displacing the collector and basic condenser. However, a different setting of the opening of the field diaphragm and of the aperture diaphragm is still required for each objective, which hinders work by requiring frequent objective changing.

SUMMARY OF THE INVENTION

The invention is therefore based on the object of providing an illumination device for microscopes for changing between a large illumination aperture and a small illuminated field on the one hand and a small illumination aperture and a large illuminated field on the other hand, in which not only is it intended for the image positions both of the field diaphragm and of the light source to remain unchanged in both switchable types of illumination, but also in which it is additionally intended for a rapid automatic adaptation of the illumination to be performed when changing from a weakly magnifying low-power scanning objective to a highly magnifying objective by two switch positions without adjusting the opening of the field diaphragm and of the aperture diaphragm. At the same time, for reasons of space and cost, the construction of the condenser is retained as far as possible, in order for it also to not to be necessary to provide the multiple function elements usually arranged in the condenser, such as for example filters, prisms, etc.

This object is achieved according to the invention by an illumination device for microscopes including a fixed lamp assembly having a light source, a collector, and a field diaphragm; a fixed basic condenser; a first switchable condenser head which is switchable into a beam path; and an aperture diaphragm arranged between the collector and the field diaphragm. A switchable condenser lens element is arranged between the lamp assembly and the fixed basic condenser and is switchable. When in the beam path, the switchable condenser lens element simultaneously fixes an image position both of the field diaphragm and of the light source. At least two auxiliary lenses are located between the collector and the basic condenser to image the light source both into an aperture diaphragm plane and into a plane conjugate to the aperture diaphragm and additionally image the collector into a field diaphragm plane. The switchable condenser lens element is switchable in between the field diaphragm and the plane conjugate to the aperture diaphragm. A second switchable condenser head is switchable simultaneously with the switchable condenser lens element to replace the first switchable condenser head. The overall magnification of the fixed basic condenser and the first switchable condenser head and the overall magnification of the fixed basic condenser, the second switchable condenser head, and the switchable condenser lens element being in a fixed ratio corresponding to a graduation of switchable objective magnifications.

By the invention, an adaptation of the difference in magnification of the switchable condenser variants to the range of objective magnifications is accomplished. For all the pairs of objectives having magnifications in the same ratio as the magnifications of the condenser in the two switch positions, with correctly set Köhler illumination the field-diaphragm and aperture-diaphragm positions are the same. Therefore, once the opening of these diaphragms has been set for these pairs of objectives, a rapid switching back and forth is possible with perfectly exact illumination. This provides a simple automatic means of illumination for two objective magnifications in each case.

By retaining the basic construction of the condenser with a fixed basic condenser, filters, prisms etc. fitted in the condenser housing can be used in both switch positions without any laborious conversion.

BRIEF DESCRIPTION OF THE DRAWINGS

The invention is explained in more detail with reference to exemplary embodiments diagrammatically represented in the drawings, in which:

FIG. 1 shows an illumination device with a large aperture and a small illuminated field, and FIG. 2 shows an illumination device after switching over to a small aperture and a large illuminated field with the aid of another condenser head according to the invention and a simultaneously switched additional condenser lens element.

DETAILED DESCRIPTION OF PREFERRED EMBODIMENTS OF THE INVENTION

The invention is based on the idea of combining a basic condenser with various condenser heads which can he fitted as a matter of choice and additionally of imaging the physical aperture diaphragm, which is usually in the condenser, initially into a plane which is arranged in the condenser and is conjugate with the aperture plane. Its position can he varied by optical means, so that retention of the Köhler illumination is ensured even when switching over condensers, without having to change the opening of the physically existing diaphragms and without having to fit additional aperture diaphragms into the condenser. For this purpose, a physical aperture diaphragm is fitted between the collector and the field diaphragm and is imaged by an additional intermediate imaging into a plane which is situated in the condenser and is conjugate with it. For the intermediate imaging, at least two auxiliary lenses are arranged between the collector and the condenser. Depending on the design of the lenses, they may be provided on both sides of the aperture and field diaphragms or be nested between them.

The condenser heads are designed in their imaging power such that, in combination with the basic condenser or the basic condenser and an additional condenser lens element, they in each case produce fixed magnifications. In this case, the overall magnifications of the condenser in the two switch positions are chosen such that they are in the same ratio as the magnifications of selected pairs of objectives.

Pairs of objectives which include a weakly magnifying low-power scanning objective and a highly magnifying objective for the viewing of details are advantageously selected. It is thus possible with a magnification ratio of 1:4 in the two condenser positions to illuminate optimally the pairs of objectives "2.5x and 10x", "5x and 20x" and also "10x and 40x" automatically in each case. For each pair of objectives it is simply necessary to set the field diaphragm and the aperture diaphragm correctly at the beginning of microscope work. For all further switchings of the illumination device to suit the chosen objective, the illumination is then optimally adapted automatically.

Other magnification ratios of the condenser positions are similarly possible, provided that they correspond to the magnification graduation of the objectives. In this case reference is advantageously made to frequently switched objectives, such as are encountered in routine laboratory investigations.

An advantageous type of design of the novel illumination device is obtained if a common gear mechanism (element 13 in FIGS. 1 and 2) is provided for the switching over of the two condenser settings. Then, when one condenser head is swivelled in, at the same time the condenser lens element and the additional condenser head assigned to it are swiveled out, and vice versa.

Both the condenser lens element and the condenser heads are advantageously to be included in the correction of the respectively effective condenser.

In the case of microscopes with a device for detecting the currently swivelled-in objective, the possibility of motorized activation of the required condenser position (by motorizing gear mechanism 13 shown in FIGS. 1 and 2) to suit the currently swivelled-in objective (using logic circuit 14 shown in FIGS. 1 and 2) is an appropriate option.

FIG. 1 shows the illumination device according to the invention in the setting for large apertures and small illuminated fields.

In the lamp part, comprising light source 1, collector 2 and field diaphragm 3, according to the invention the aperture diaphragm 4 is arranged between the field diaphragm 3 and the collector 2. The first auxiliary lens 5 is arranged between the collector 2 and the aperture diaphragm 4, the second auxiliary lens 6 is arranged between the aperture diaphragm 4 and the field diaphragm 3. A following lens forms the basic condenser 7.

The light source i is imaged by the collector 2 and the two auxiliary lenses 5 and 6 both into the aperture diaphragm plane and into a plane 12 which is conjugate with the aperture diaphragm 4 and is between the field diaphragm 3 and the basic condenser 7. The plane 12 which is conjugate to the aperture diaphragm 4 lies in the rear focal plane of the condenser 7, 8 comprising the basic condenser 7 and the switchable condenser head 8. This condenser projects the image of the light source 1 to infinity and images the field diaphragm 3 into the object plane 9.

To magnify the illuminated field in the object plane 9 bounded by the path of the beam shown in solid lines, the condenser head 8 is removed from the path of the beam and, according to the invention, a second condenser head 10 and the condenser lens element 11 are switched-in in place of it. FIG. 2 shows this working position of the illumination device with an enlarged illuminated field and reduced aperture.

In this working position, the plane 12 conjugate with the aperture diaphragm 4 has been displaced in the direction of the field diaphragm 3 under the influence of the condenser lens element 11. By suitable choice of the second condenser head 10 and of the condenser lens element 11, the field diaphragm 3 is sharply imaged into the object plane 9 by the condenser 7, 10, 11 with a magnification factor chosen to correspond to the graduation of the objective magnifications. The light source image again appears at infinity.

The aperture is reduced by the same factor by which the illuminated field is enlarged. The settings of the field diaphragm 3 and of the aperture diaphragm 4 need not be changed any longer when switching over the condenser once they have been set to correspond to Köhler illumination at the beginning of microscope work.

| LIST OF REFERENCE NUMERALS | |
|---|---|
| 1 | Light source |
| 2 | Collector |
| 3 | Field diaphragm |
| 4 | Aperture diaphragm |
| 5 | First auxiliary lens |
| 6 | Second auxiliary lens |
| 7 | Basic condenser |
| 8 | Condenser head |
| 9 | Object plane |
| 10 | Second condenser head |
| 11 | Condenser lens element |
| 12 | Plane conjugate with the aperture diaphragm |
| 13 | Gear Mechanism |
| 14 | Logic circuit |

We claim:

1. An illumination device for microscopes comprising:

a fixed lamp assembly having a light source, a collector, and a field diaphragm;

a fixed basic condenser;

a first switchable condenser head which is switchable into a beam path;

an aperture diaphragm arranged between the collector and the field diaphragm;

a switchable condenser lens element, switchable into the beam path between the lamp assembly and the fixed basic condenser, which, when in the beam path, simultaneously fixes an image position both of a field diaphragm plane and of the light source;

at least two auxiliary lenses between the collector and the fixed basic condenser which image the light source both onto an aperture diaphragm plane and onto a plane conjugate to the aperture diaphragm plane and additionally image the collector onto a field diaphragm plane, wherein the switchable condenser lens element is switchable into the beam path between the field diaphragm and the plane conjugate to the aperture diaphragm plane; and a second switchable condenser head which is switchable into the beam path simultaneously with the switchable condenser lens element to replace the first switchable condenser head, an overall magnification of the fixed basic condenser and the first switchable condenser head and an overall magnification of the fixed basic condenser, the second switchable condenser head, and the switchable condenser lens element being in a fixed ratio corresponding to a graduation of switchable objective magnifications;

wherein the illumination device can maintain Köhler illumination when switching condensers without having to change the opening of diaphragms and without having to add additional diaphragms.

2. An illumination device for microscopes according to claim 1, further comprising a mechanism for simultaneously switching-in the second switchable condenser head and the switchable condenser lens element.

3. An illumination device for microscopes according to claim 1, wherein the switchable condenser lens element and the second switchable condenser head are included in correction of the fixed basic condenser, the second switchable condenses head, and the switchable condenser lens element, and the first switchable condenser head is included in correction of the fixed basic condenser and the first switchable condenser head.

4. An illumination device for microscopes according to claim 1, further comprising a circuit for the assignment of a required condenser setting based on a device on the microscope for detecting a currently swivelled-in objective, and a motorized mechanism activated by the circuit for producing a currently required condenser setting.

5. An illumination device for a microscope, comprising:

a light source at an origin of a beam path;

a collector disposed along the beam path;

a field diaphragm disposed along the beam path;

a fixed basic condenser disposed along the beam path;

an aperture diaphragm disposed along the beam path between the collector and the field diaphragm;

a first switchable condenser lens assembly having a first switchable condenser head which is switchable into the beam path such that the fixed basic condenser and the first switchable condenser head form a condenser;

a second switchable condenser lens assembly having a second switchable condenser head and a switchable condenser lens element which are simultaneously switchable into the beam path such that the fixed basic condenser, the second switchable condenser head and the switchable condenser lens element form another condenser;

wherein the illumination device can maintain Köhler illumination when switching condensers without having to change the opening of diaphragms and without having to add additional diaphragms.

6. An illumination device according to claim 5, wherein the switchable condenser lens element is switchable into the beam path between the field diaphragm and a plane conjugate to the aperture diaphragm.

7. An illumination device according to claim 5, further comprising at least two auxiliary lenses, disposed in the beam path between the collector and the fixed basic condenser, which image the light source both onto an aperture diaphragm plane and onto a plane conjugate to the aperture diaphragm plane and also image the collector onto a field diaphragm plane.

8. An illumination device according to claim 5, wherein an overall magnification of the fixed basic condenser and the first switchable condenser head and an overall magnification of the fixed basic condenser, the second switchable condenser head, and the switchable condenser lens element are in a fixed ratio corresponding to a graduation of switchable objective magnifications.

* * * * *